Aug. 11, 1942.　　　C. F. LAMBERT　　　2,292,702
AMMUNITION TANK
Filed Dec. 11, 1939　　　2 Sheets-Sheet 1

Lap Weld　　Butt Weld

INVENTOR.
Charles F. Lambert
BY
ATTORNEYS

Aug. 11, 1942.    C. F. LAMBERT    2,292,702
AMMUNITION TANK
Filed Dec. 11, 1939    2 Sheets-Sheet 2

INVENTOR.
Charles F. Lambert
BY
Barnes, Kisselle, Laughlin & Raisch
ATTORNEYS

Patented Aug. 11, 1942

2,292,702

UNITED STATES PATENT OFFICE 2,292,702

AMMUNITION TANK

Charles F. Lambert, Detroit, Mich., assignor to Clayton & Lambert Manufacturing Company, Detroit, Mich., a corporation of Delaware Application December 11, 1939, Serial No. 308,531

6 Claims. (Cl. 206—3)

This invention relates to ammunition tanks and has particularly to do with an airtight stowage tank of the type disclosed in Patents Nos. 2,052,491 and 2,127,263.

In previous designs of this type of tank, it has been common to form the tank of a tubular body portion with drawn end portions which are butt welded to the body portion. This welding had to be done by hand and after the welding was finished the weld had to be smoothed by a rolling process. This rolling process tended to lengthen the tank and even though the lengthening was allowed for, it was impossible to get two tanks to come out exactly alike because of the differences in the hand-welding jobs and the rolling jobs. Consequently many of the tanks manufactured by this process would not be within the close dimensions required for their use. In addition, it was necessary to wash the flux off the hand-weld job and this involved an additional process and added to the expense of manufacture.

The present invention contemplates an ammunition tank which is so constructed that the dimensions are reliably accurate, the tank is stronger, and there is a considerable saving in the cost of manufacture. With the design contemplated, very little hand-welding is necessary and the rolling operation, above referred to, may be eliminated. The present design contemplates a body portion which is formed from a sheet metal and which is welded to a drawn end portion. Sheet metal is cheaper than tubular metal of the same thickness and, in addition, the joint which is provided for the body portion is of the type which will reinforce the entire tank and prevent collapsing. The joint between the parts is so arranged that an accurate overall weight of the tank can always be obtained.

It will be understood from reference to the above patents that the type of tank under consideration is that type which may be stowed in reversed end positions, the tanks being so designed that stacks of the same will be locked together.

Other objects and features of the invention having to do with details of construction, will be further brought out in the following description and claims.

Figure 1:
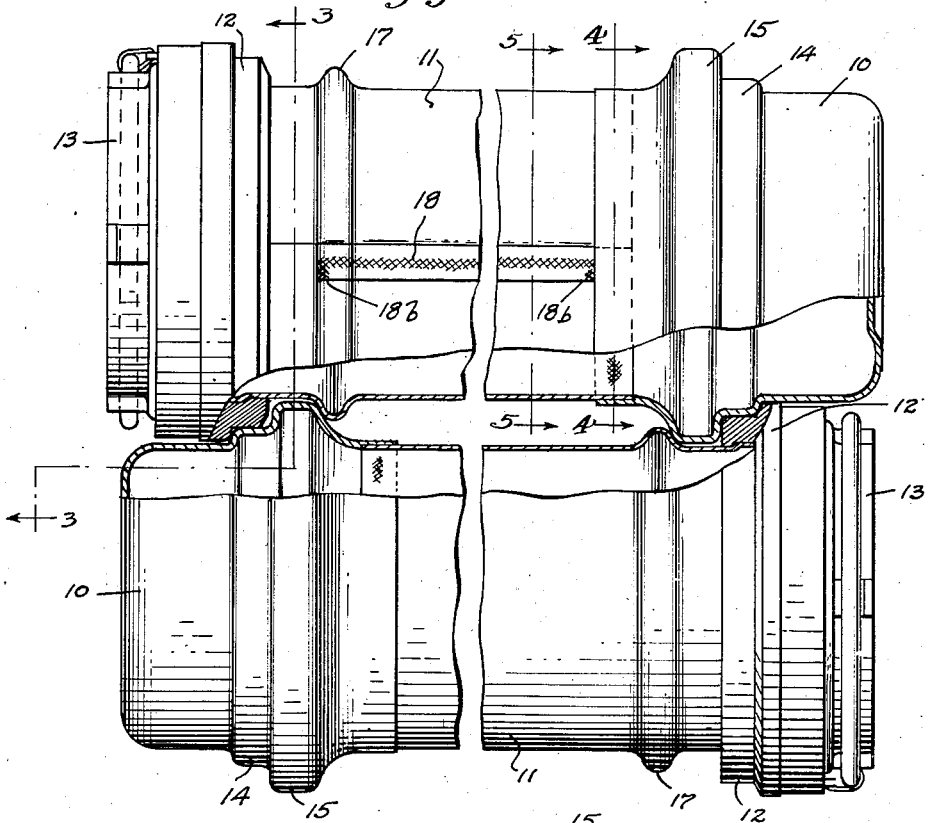
Fig. 1 illustrates two completed tanks partially in section, showing the manner in which reversed end stowage may be accomplished.
Figure 2:
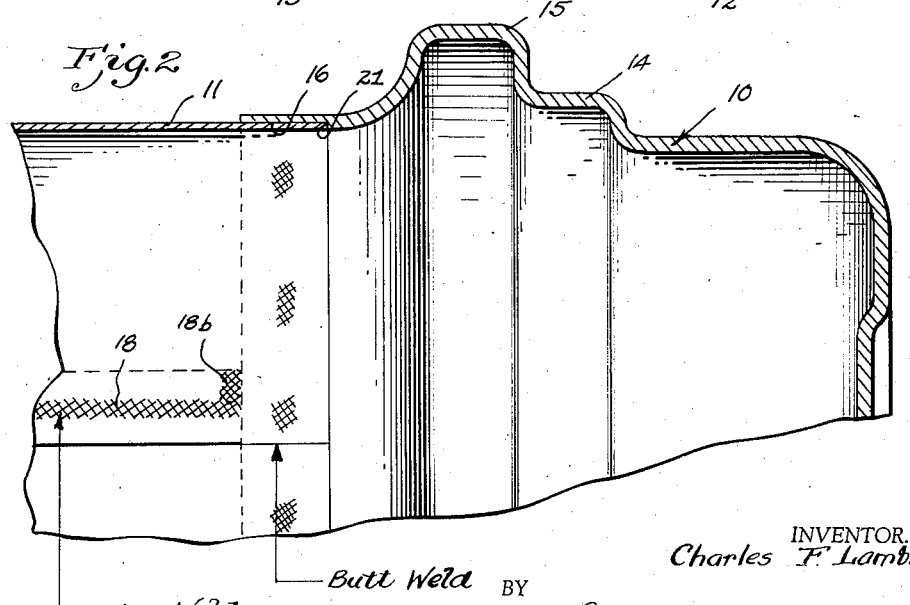
Fig. 2 is a partial section illustrating details of the joints of the tank.
Figure 3:
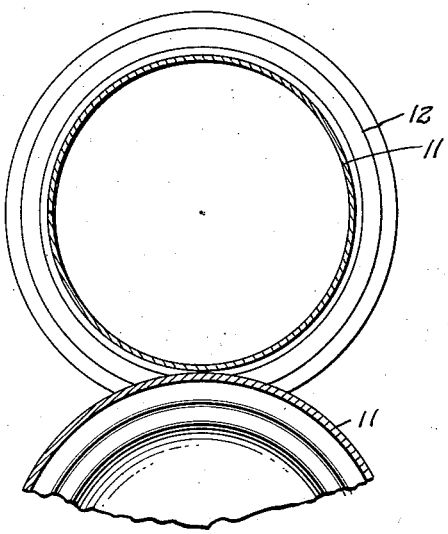
Figure 4:
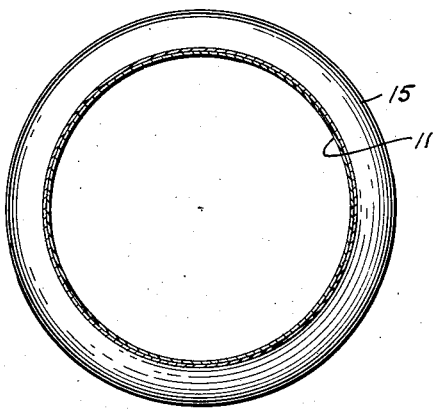
Figure 5:
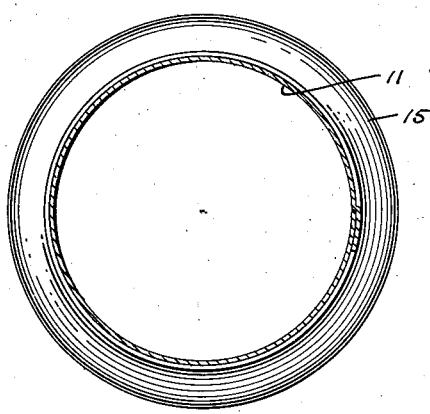

Figs. 3, 4 and 5 are sections taken on the lines 3—3, 4—4, and 5—5 respectively, of Fig. 1.

Figure 6:
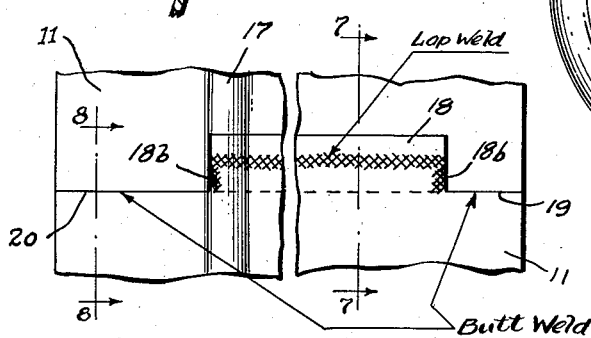

Fig. 6 is an inside view of the joint of the body section.

Figure 7:
Figure 8:
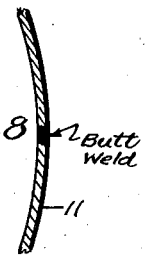

Figs. 7 and 8 are sections taken on the lines 7—7 and 8—8 respectively, of Fig. 6.

The ammunition tank consists in the main of a bottom or end portion 10, a body portion 11, an end ring 12, and a sealing cover 13. The bottom member 10 is preferably in the form of a drawn sheet aluminum unit with projecting annular portions 14 and 15 used in spacing the tanks. The bottom portion 10 has an open end facing toward the body, the inside surface of which is machined as at 16 to provide an annular recess.

The body portion 11 is formed of a flat sheet of aluminum, the sheet being rolled upon itself to form a split tube. The sheet is embossed as at 17 in the same process. The joint of the body member is not uniform throughout its length. The mid-portion of the joint is formed by a lapped portion 18 welded as shown in section in Fig. 7. This lap weld extends to within a certain distance of each end of the body as shown in Fig. 6. The lap weld passes over the embossed portion 17 at one end of the body and at the other end of the body is spaced from the end a distance equal to the axial depth of the annular recesses 16 in the bottom portion 10. As shown in Fig. 7, the lap weld 18 is formed by embossing one edge of the body portion so that the other edge may abut directly against a shoulder 18a. This insures a rigid construction and a definite diameter. The ends of the lapped portion 18 are welded as at 18b to form a complete seal.

At these end portions which extend beyond the lap weld, there are butt welds 19 and 20, respectively. Fig. 8 illustrates a sectional view of these butt welds.

In assembling the various portions of the tank, the end of the body portion having the short butt weld 19 is inserted into the annular machined recess 16 of bottom member 10 and welded therein. The end of the body portion will abut against the shoulder 21 which is formed by the recess and consequently, there will be a positive connection between the two portions of the tank. At the other end of the tank a reinforcing ring 12 is fastened by a method which is common practice, see, for example, Patent No. 2,052,491.

As will be seen from Fig. 1, the annular projection 15 of the bottom portion 10 extends into the space between the embossed projection 17 on the body portion and the ring 12. Consequently, the lap weld 18 should not extend beyond the embossed projection 17.

What I claim is:

1. An ammunition tank comprising an end portion formed of a deep drawn cylindrical shell having an open end and a sharp inwardly extending shoulder inside and spaced from the open end of said shell, a central portion formed of a sheet metal and comprising a split tube with a reinforcing overlap joint at the mid-portion and a butt joint at each end, said butt joint at one end of said tube being provided to give a definite dimension thereto whereby said end may be snugly received by the open end of said drawn end portion and welded in abutment with said shoulder, and a reinforcing ring at the other end of said tube.

2. An ammunition tank of the type designed to be stacked alternately end to end, comprising an end formed as a deep drawn cylindrical shell having an open end, the inside surface of said open end being machined to provide an annular recess around said opening terminating in a sharp shoulder spaced from said open end, a central portion formed of sheet metal and comprising a split tube, the middle portion of the joint in said tube being a lap joint and the end portions of said joint being a butt joint, one end of said tube being positively dimensioned by reason of said butt joint to be received by the annular recess in said drawn end and welded therein in contact with said shoulder, and a reinforcing ring at the other end of said tube.

3. An ammunition tank of the type accurately dimensioned and designed to be stacked alternately end to end, comprising an end formed as a deep drawn cylindrical shell having an open end, the inside surface of said open end being machined to provide an annular recess around said opening terminating in a sharp shoulder spaced from said open end, a central portion formed of sheet metal and comprising a split tube, having a butt joint at each end thereof, one end of said tube being positively dimensioned by reason of said butt joint to be received by the annular recess in said drawn end and welded therein in contact with said shoulder, and a reinforcing ring at the other end of said tube.

4. The method of forming an accurately dimensioned ammunition tank of the type shaped at the ends to allow alternate stacking which comprises forming a center portion of said tank by rolling a flat piece of metal into an open ended cylinder of predetermined length having a lapped joint, welding the contacting ends of said joint, forming a dish-shaped end, forming an annular shoulder on said dish-shaped end spaced a predetermined distance from the bottom thereof for abutting against the end of said center cylinder to receive one end of said cylinder, and welding said end to said center cylinder to form a complete tank.

5. The method of forming an accurately dimensioned ammunition tank of the type shaped at the ends to allow alternate stacking which comprises forming a center portion of said tank by rolling a flat piece of metal into an open ended cylinder of predetermined length having a lapped joint, forming said lapped joint at the ends to permit a butt joint, welding said joints, forming a dish-shaped end to be applied to said cylinder, forming an annular recess in said shaped end to receive one end of said cylinder, forming a shoulder in said recess spaced a predetermined distance from the bottom of the dish-shaped end, abutting the shoulder against the end of the cylinder, and welding said shaped end to the end of said cylinder.

6. An ammunition tank comprising an end portion formed of a deep, drawn cylindrical shell having an open end and means forming an annular shoulder inside and spaced from the open end of said shell, a central portion formed of sheet metal and comprising a split tube with a reinforcing overlap joint at the mid-portion and a butt joint at each end, one end of said tube being dimensioned to be snugly received by the open end of said drawn shell and welded thereto with the end of the tube abutting said shoulder, and a reinforcing ring at the other end of said tube.

CHARLES F. LAMBERT.